(12) United States Patent
Hsieh

(10) Patent No.: US 7,509,711 B2
(45) Date of Patent: Mar. 31, 2009

(54) STRESS-INDICATING ROPE-TIGHTENING APPARATUS

(76) Inventor: Ching-Fong Hsieh, No. 2-1, Pei Ping 3rd Street, North District, Taichung (TW)

( * ) Notice: Subject to any disclaimer, the term of this patent is extended or adjusted under 35 U.S.C. 154(b) by 99 days.

(21) Appl. No.: 11/671,644

(22) Filed: Feb. 6, 2007

(65) Prior Publication Data

US 2008/0047365 A1    Feb. 28, 2008

(30) Foreign Application Priority Data

Jun. 30, 2006    (TW) .............................. 95123819 A

(51) Int. Cl.
  B66D 3/02    (2006.01)
  B25B 25/00   (2006.01)
  G01L 5/10    (2006.01)
  G01L 1/22    (2006.01)
(52) U.S. Cl. .................... 24/68 CD; 24/68 R; 254/218; 254/213; 73/862.392; 73/862.628
(58) Field of Classification Search ................ 410/100, 410/103, 96; 24/68 R, 68 CD, 68 CT, 69 ST; 254/256, 249, 248, 222, 223, 218, 217, 213; 73/862.392–862.393, 862.621, 862.627–862.642; B66D 3/00
See application file for complete search history.

(56) References Cited

U.S. PATENT DOCUMENTS

| | | | |
|---|---|---|---|
| 5,542,798 A * | 8/1996 | Rawdon et al. | ............ 410/100 |
| 6,048,146 A * | 4/2000 | Wiedmeyer | ................. 410/100 |
| 6,167,788 B1 * | 1/2001 | Schonberger et al. | .... 73/862.23 |
| 6,463,811 B1 * | 10/2002 | Putney | ..................... 73/862.21 |
| 6,847,290 B2 * | 1/2005 | Tardif | ......................... 340/440 |
| 6,908,073 B1 * | 6/2005 | Hsien | ......................... 254/218 |
| 7,093,327 B2 * | 8/2006 | Huang | ..................... 24/68 CD |
| 7,219,396 B2 * | 5/2007 | Hsieh | ......................... 24/68 R |
| 7,219,951 B2 * | 5/2007 | Rasmussen | ................. 296/156 |
| 7,231,693 B2 * | 6/2007 | Wilcox et al. | ............... 24/68 R |
| 2004/0104380 A1 * | 6/2004 | Huang | ........................ 254/218 |
| 2005/0177984 A1 * | 8/2005 | Huang | ..................... 24/68 CD |
| 2005/0278902 A1 * | 12/2005 | Wilcox et al. | ............ 24/68 CD |
| 2006/0277726 A1 * | 12/2006 | Hsieh | ......................... 24/68 R |

OTHER PUBLICATIONS

Taiwanese Patent No. M279629, Nov. 1, 2005, 8 pages.

\* cited by examiner

*Primary Examiner*—Harshad Patel
*Assistant Examiner*—Jonathan Dunlap
(74) *Attorney, Agent, or Firm*—Alan Kamrath; Kamrath & Associates PA

(57) ABSTRACT

A stress-indicating rope-tightening apparatus includes a rope-tightening unit and a stress-indicating unit. The rope-tightening unit includes a rotational joint. The stress-indicating unit includes two strain gauges disposed on two opposite sides of the rotational joint for measuring the strain in the rotational joint, a calculator for calculating the stress in the rope based on the strain in the rotational joint and a display for showing the stress in the rope.

10 Claims, 5 Drawing Sheets

STRESS-INDICATING ROPE-TIGHTENING APPARATUS

BACKGROUND OF INVENTION

1. Field of Invention

The present invention relates to a stress-indicating rope-tightening apparatus.

2. Related Prior Art

A rope-tightening device is used to tighten a rope for bundling an object or more. However, the rope would be broken if the stress therein exceeds a limit. In the case of the rupture of the rope, loss of property is inevitable. What is worse, casualty might be entailed.

To avoid the foregoing drawbacks, a conventional rope-tightening device 1 is equipped with a stress-indicating unit as disclosed in Taiwanese Patent M279629. The rope-tightening device 1 includes a frame 10, a first hook 11 attached to the frame 10, a second hook 15, a pulley connected to the second hook 15, a rope 14 wound around the pulley, a reel 13 disposed on the frame 10 for reeling the cable 14 and a handle 12 disposed on the frame 10 for rotating the reel 13. The reel 13 includes two ratchet wheels. Two detents 121 are connected to the handle 12. When the handle 12 is pivoted relative to the reel 13 in a direction, the detents 121 engage with the ratchet wheels so that the handle 12 rotates the reel 13 to tighten the rope 14. When the handle 12 is pivoted relative to the reel 13 in an opposite direction, the detents 121 rattle on the ratchet wheels so that the handle 12 does not rotate the reel 13 to slacken the rope 14.

The stress-indicating unit includes a strain gauge 101, an integration element 102 and a display 103. The strain gauge 101 is disposed on a side of the frame 10. The strain gauge 101 and the display 103 are electrically connected to the integration element 102. The use of the stress-indicating unit is based on an assumption that the stress in the frame 10 gets larger as the stress in the rope 14 gets larger. The strain gauge 101 detects the strain in the frame 10. The integration element 102 calculates the stress in the rope 14 based on the strain in the frame 10. The integration element 102 instructs the display 103 to show the stress in the rope 14. However, the operation is not precise as the strain gauge 101 is disposed on the frame 10. The monitoring of the stress is inconvenient as the display 103 is disposed on the side of the frame 10.

The present invention is therefore intended to obviate or at least alleviate the problems encountered in the prior art.

SUMMARY OF INVENTION

According to the present invention, a stress-indicating rope-tightening apparatus includes a rope-tightening unit and a stress-indicating unit. The rope-tightening unit includes a rotational joint. The stress-indicating unit includes two strain gauges disposed on two opposite sides of the rotational joint for measuring the strain in the same, a calculator for calculating the stress in the rope based on the strain in the rotational joint and a display for showing the stress in the rope.

An advantage of the rope-tightening apparatus according to the present invention is precise operation, since there are two strain gauges disposed on two opposite sides of the rotational joint.

Another advantage of the rope-tightening apparatus according to the present invention is easy monitoring of the stress in the rope, since the stress-indicating unit can be rotated as it is disposed on the rotational joint.

Other advantages and features of the present invention will become apparent from the following description referring to the drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
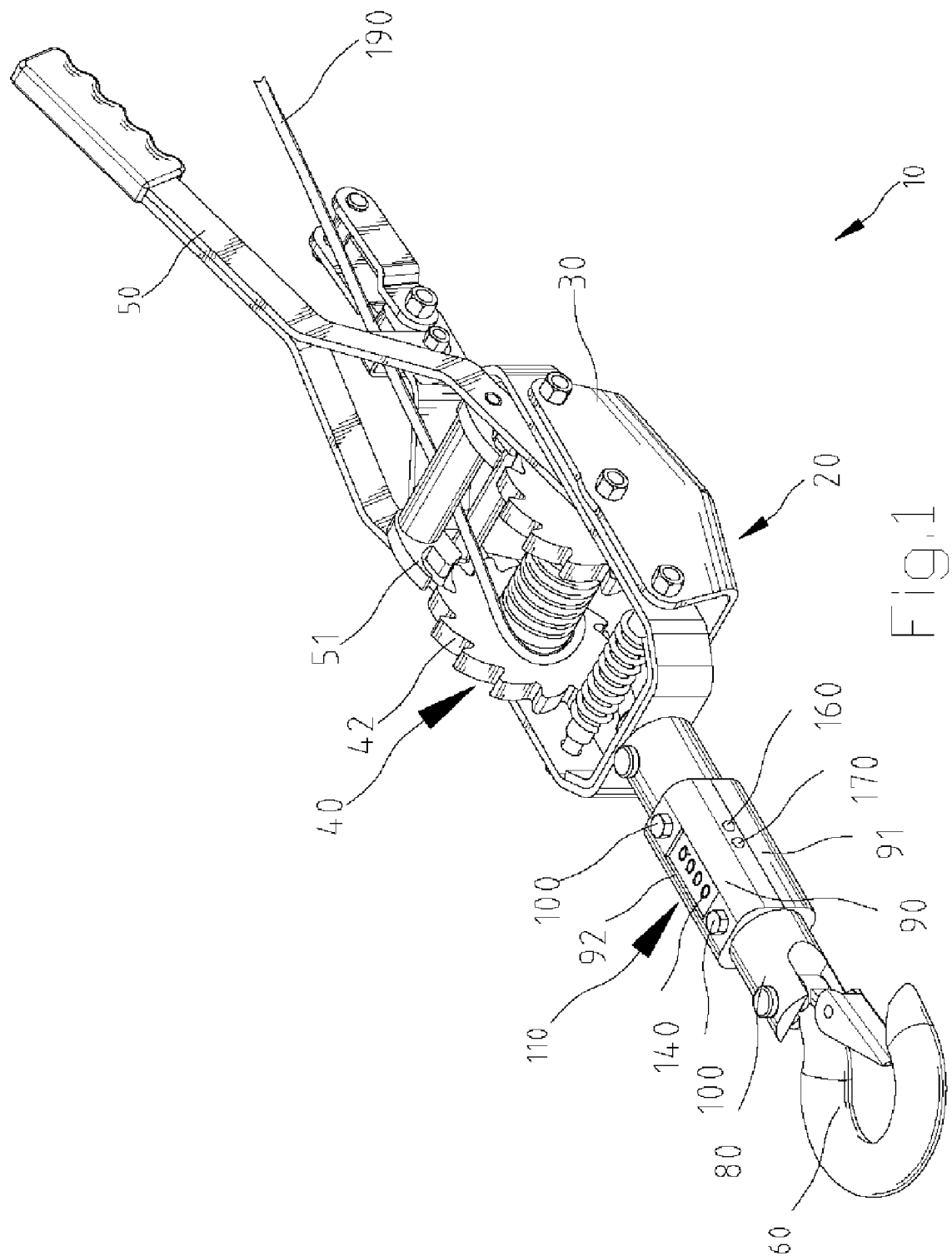
FIG. 1 is a perspective view of a stress-indicating rope-tightening apparatus according to the preferred embodiment of the present invention.

Referring to FIGS. 1 through 5, a stress-indicating rope-tightening apparatus 10 includes a rope-tightening unit 20 and a stress-indicating unit 110 according to the preferred embodiment of the present invention. The rope-tightening unit 20 is used to tighten a rope 190 while the stress-indicating unit 110 is used to measure and show the stress in the rope 190.

The rope-tightening unit 20 includes a frame 30, a first hook 60, a rotational joint 80 for connecting the first hook 60 to the frame 30, a second hook 70 connected to the rope 190 through a pulley, a reel 40 for reeling the rope 190 and a handle 50 for rotating the reel 40. The reel 40 includes a shaft 41 formed between two ratchet wheels 42. Two detents 51 are connected to the handle 50.

Figure 2:
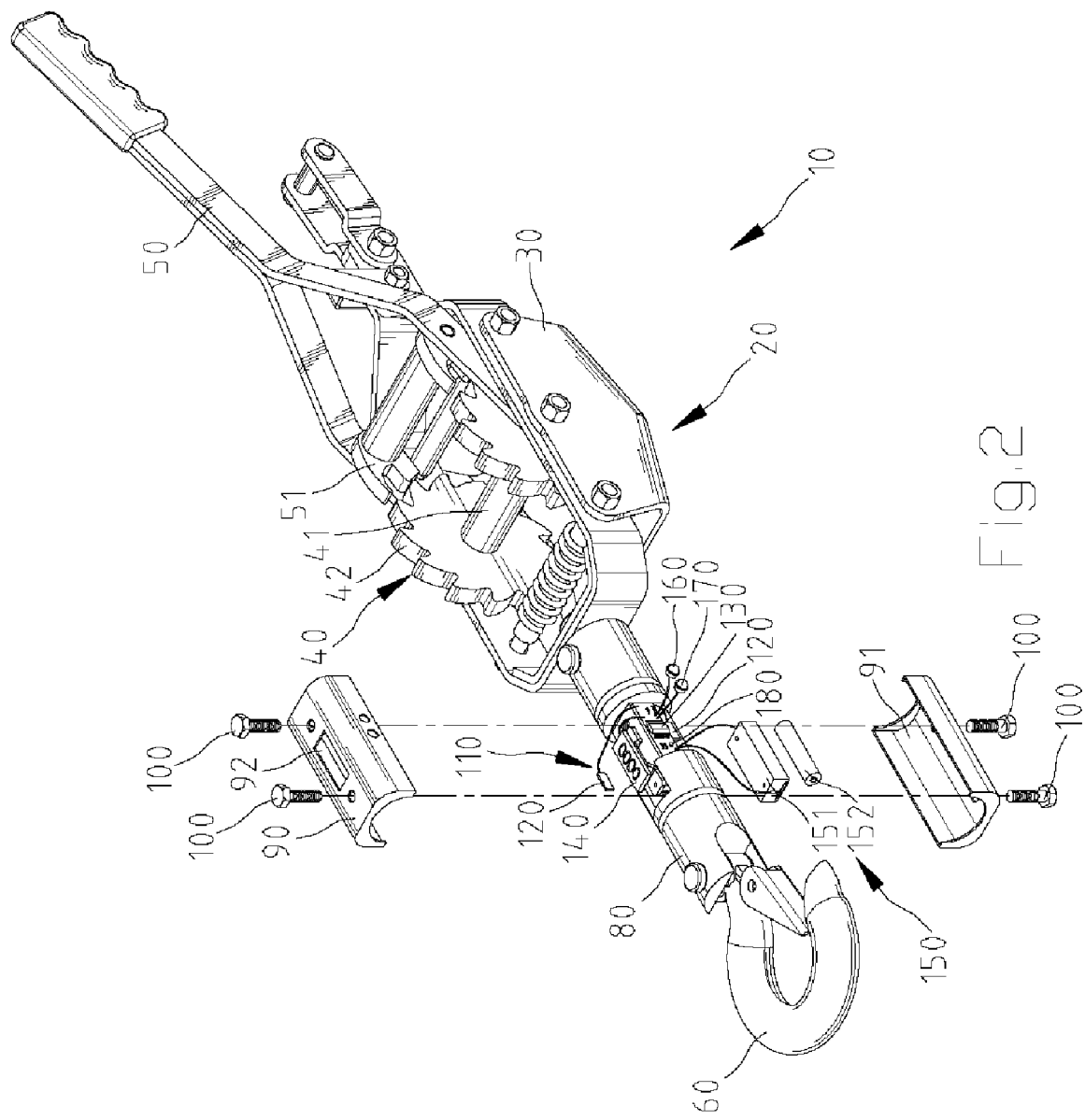
FIG. 2 is an exploded view of the stress-indicating rope-tightening apparatus shown in FIG. 1.

The stress-indicating unit 110 is disposed on the rotational joint 80. As best shown in FIG. 2, the stress-indicating unit 110 includes two strain gauges 120, a calculator 130, a display 140, a battery set 150, a first light 160, a second light 170 and a beeper 180. The strain gauges 120 are attached to two opposite sides of rotational joint 80. The strain gauges 120, the display 140, the first light 160, the second light 170 and the beeper 180 are electrically connected to the calculator 130. The battery set 150 is used to energize the entire stress-indicating unit 110. The battery set 150 includes at least one battery 152 and a box 151 for containing the battery 152. The foregoing electronic elements are housed by two covers 90 and 91 joined together by fasteners 100 such as threaded bolts. A transparent panel 92 is fit in a window defined in the cover 90. Thus, the display 140 can be observed through the transparent panel 92.

Figure 5:
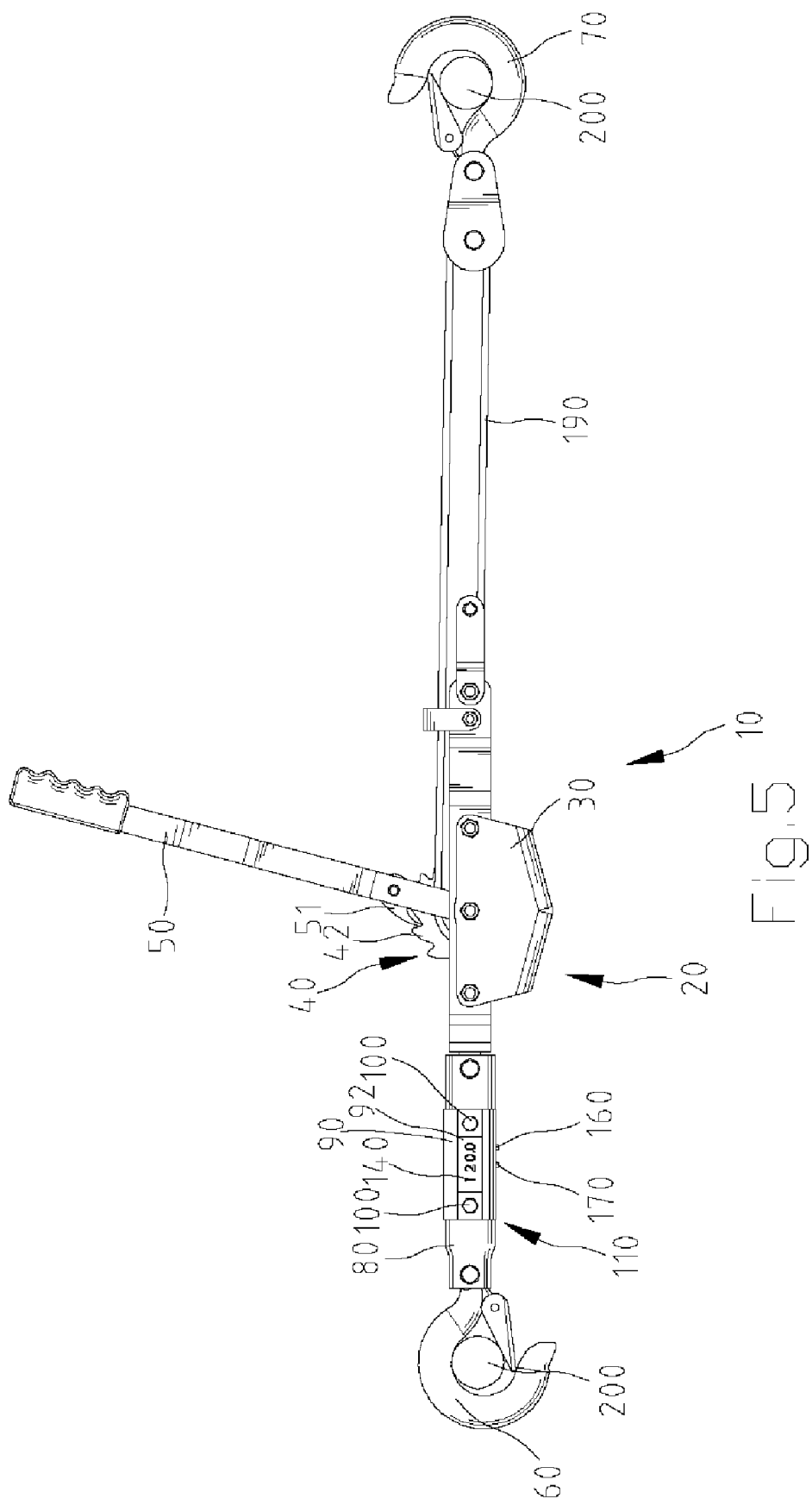
FIG. 5 is a side view of the stress-indicating rope-tightening apparatus in another position than shown in FIG. 4.

Referring to FIGS. 2 and 5, in operation, the hooks 60 and 70 hook two objects 200. The handle 50 is pivoted relative to the reel 40 in a direction, the detents 51 engage with the ratchet wheels 42 so that the handle 50 rotates the reel 40 to tighten the rope 190. Then, the handle 50 is pivoted relative to the reel 40 in an opposite direction, the detents 51 rattle on the ratchet wheels 42 so that the handle 50 does not rotate the reel 40 to slacken the rope 190. The handle 50 is pivoted to and fro so that the rope 190 is properly tightened.

To ensure the proper tightening of the rope 190, the stress-indicating unit 110 is used. The strain gauges 120 detect the strain in the rotational joint 80. The calculator 130 calculates the stress in the rope 190 based on the strain in the rotational joint 80 and instructs the display 140 to show the stress in the rope 190. When the stress in the rope 190 is below a limit, the first light emits green light, for example, to indicate that the stress in the rope 190 is within a normal range. When the stress in the rope 190 exceeds the limit, the second light 170 emits red light, for example, to warn of the overload. Furthermore, the beeper 180 produces a sound to warn of the overload.

Figure 3:
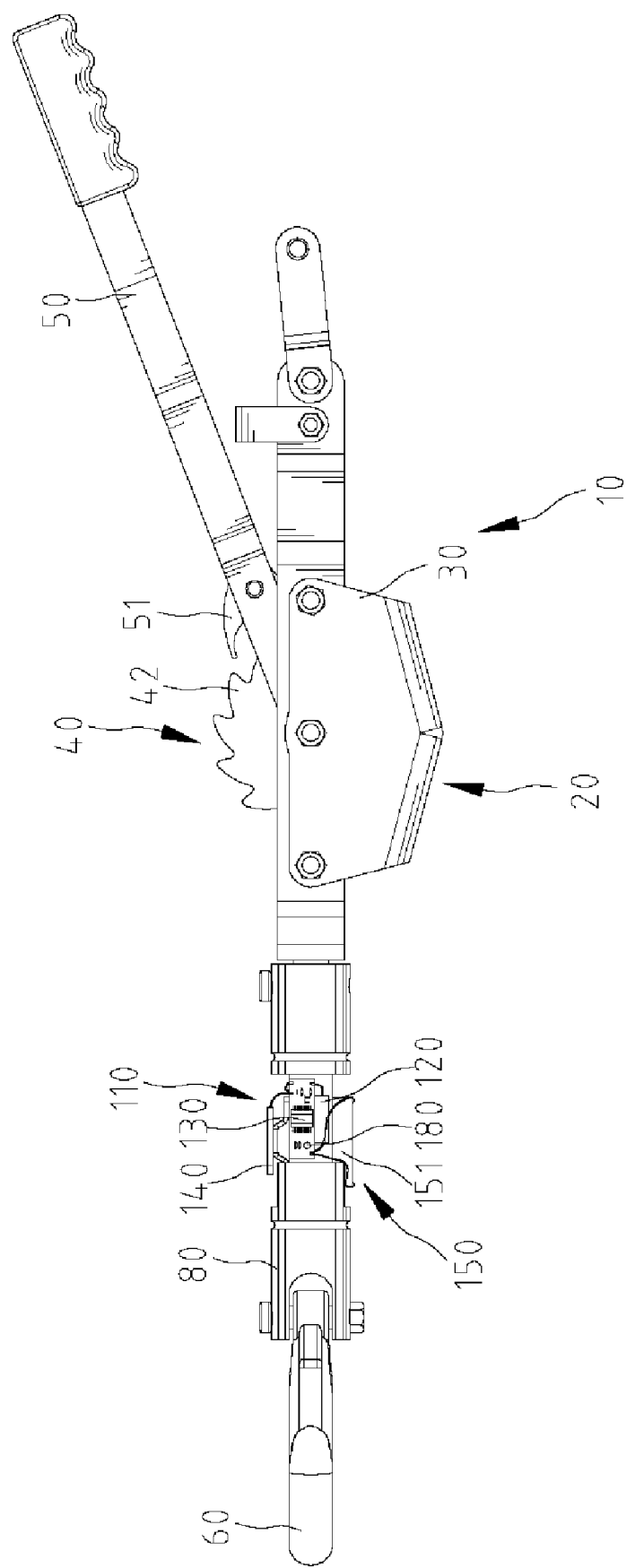
FIG. 3 is a side view of the stress-indicating rope-tightening apparatus shown in FIG. 1.
Figure 4:
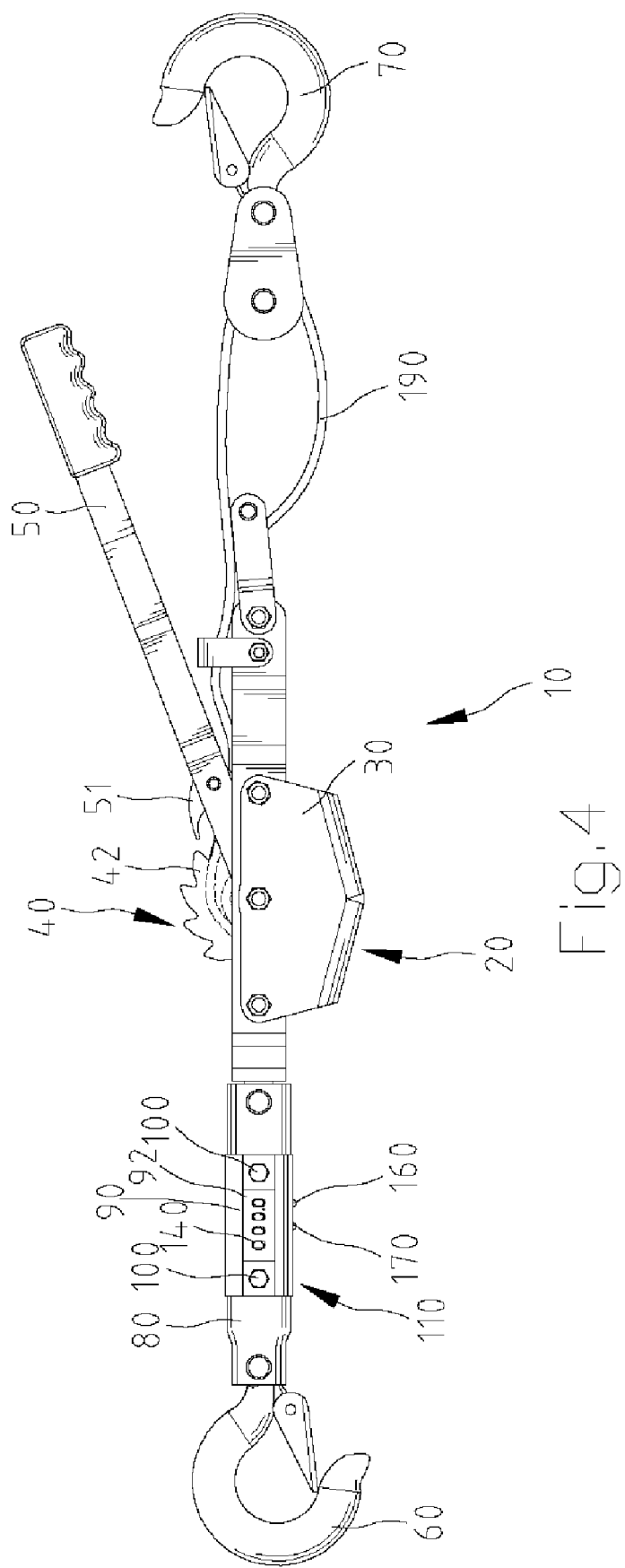
FIG. 4 is a side view of the stress-indicating rope-tightening apparatus in another position than shown in FIG. 3.

Referring to FIGS. 3 and 4, the stress-indicating unit 110 can be rotated on the rotational joint 80 so that the stress in the rope 190 can be monitored from various angles.

The rope-tightening apparatus according to the present invention exhibits at least two advantages.

Firstly, its operation is precise, since there are two strain gauges 120 disposed on two opposite sides of the rotational joint 80. When stress occurs in the rope 190, strain occurs in both of the strain gauges 120. The calculation of the stress in the rope 190 based on the strain in both of the strain gauges 120 is more precise than the calculation of the stress in the rope 190 based on the strain in only one such strain gauge.

Secondly, the monitoring of the stress in the rope 190 is convenient, since the stress-indicating unit 110 can be rotated as it is disposed on the rotational joint 80.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A stress-indicating rope-tightening apparatus comprising:
    a rope-tightening unit for tightening a rope, the rope-tightening unit comprising a rotational joint connected to an end of the rope-tightening unit and rotatable relative to the rope-tightening unit; and
    a stress-indicating unit disposed on the rotational joint and comprising:
        two strain gauges installed inside of the stress-indicating unit and respectively attached to two opposite sides of the rotational joint for measuring the strain in the rotational joint;
        a calculator electrically connected to the strain gauges and adapted for calculating the stress in the rope based on the strain values in the rotational joint measured by the two strain gauges respectively; and
        a display electrically connected to the calculator and adapted for showing the stress in the rope based on a calculation of the calculator.

2. The stress-indicating rope-tightening apparatus according to claim 1 wherein the stress-indicating unit comprises a light for emitting light when the stress in the rope exceeds a limit.

3. The stress-indicating rope-tightening apparatus according to claim 2 wherein the stress-indicating unit comprises a beeper for making a sound when the stress in the rope exceeds the limit.

4. The stress-indicating rope-tightening apparatus according to claim 2 wherein the stress-indicating unit comprises another light for emitting light when the stress in the rope is smaller than the limit.

5. The stress-indicating rope-tightening apparatus according to claim 1 wherein the stress-indicating unit comprises a battery set for energizing the strain gauges, the calculator and the display.

6. The stress-indicating rope-tightening apparatus according to claim 5 wherein the battery set comprise at least one battery and a box for containing the battery.

7. The stress-indicating rope-tightening apparatus according to claim 1 wherein the stress-indicating unit comprises two covers for containing the strain gauges, the calculator and the display.

8. The stress-indicating rope-tightening apparatus according to claim 7 wherein the stress-indicating unit comprises a transparent panel fit in a window defined in one of the covers so that the display can be observed through the transparent panel.

9. The stress-indicating rope-tightening apparatus according to claim 1 wherein the stress-tightening unit comprises:
    a frame connected to the rotational joint;
    a first hook connected to the rotational joint;
    a second hook connected to the rope by a pulley;
    a reel for reeling the rope; and
    a handle for rotating the reel.

10. The stress-indicating rope-tightening apparatus according to claim 9 wherein the reel comprise a shaft for reeling the rope and two ratchet wheels formed at two opposite ends of the shall, and the handle comprises two detents for releasable engagement with the ratchet wheels so that the handle rotates the reel.

* * * * *